F. SIBLEY & J. HOLMWOOD, Jr.

Combined Gum Box and Top.

No. 8,708. Reissued May 13, 1879.

Chas. J. Buckhit
Edw. J. Brady } Witnesses.

Frank Sibley
James Holmwood Jr. Inventors
By Michelin & Bonner
Attorneys

N. PETERS, PHOTO-LITHOGRAPHER, WASHINGTON, D. C.

UNITED STATES PATENT OFFICE.

FRANK SIBLEY AND JAMES HOLMWOOD, JR., OF BUFFALO, NEW YORK.

IMPROVEMENT IN COMBINED GUM-BOX AND TOP.

Specification forming part of Letters Patent No. 206,142, dated July 16, 1878; Reissue No. 8,708, dated May 13, 1879; application filed March 21, 1879.

*To all whom it may concern:*

Be it known that we, FRANK SIBLEY and JAMES HOLMWOOD, Jr., both of the city of Buffalo, in the county of Erie and State of New York, have invented a new and useful Improved Toy Gum-Box, of which the following is a specification, reference being had to the accompanying drawings.

This invention relates to a box or receptacle for chewing-gum or other confectionery, in which the gum is put up for sale, and which can be used as a toy, either before or after the gum is taken from the box.

The invention consists of a box or receptacle for chewing-gum or other confectionery, having its body and cover provided with central openings, whereby the box is enabled to be used as a toy, as will be hereinafter set forth.

Figure 1:
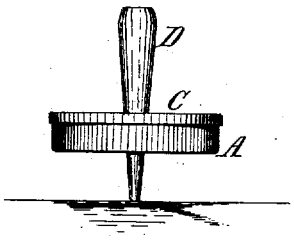
Figure 2:
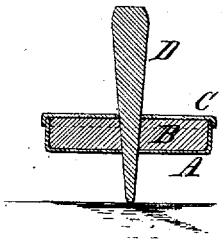
Figure 3:
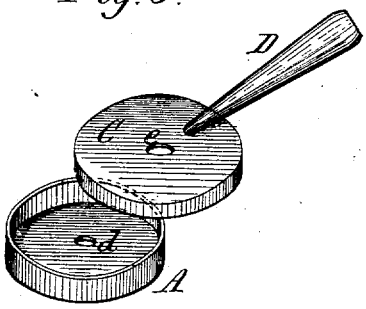
Figure 4:
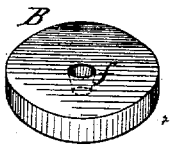

In the accompanying drawings, Figure 1 is an elevation of our improved toy gum-box. Fig. 2 is a vertical section thereof. Fig. 3 is a perspective view, showing the parts separated. Fig. 4 is a perspective view of the piece of chewing-gum.

Like letters of reference refer to like parts in each of the figures.

A represents the round box, adapted to receive a circular piece, B, of chewing-gum or other confectionery, and C is the cover fitting on the box A. Both the box and cover are preferably stamped out of tin; but they may be made of any other suitable material.

D is a tapering peg or pin, preferably made of wood, and penetrating the box A and cover C, so as to form the axis or spindle on which the receptacle rotates when used as a spinning-top. The box A and cover C are provided with central openings *d* and *e*, respectively, the opening *d* of the box being preferably made somewhat smaller than the opening *e* of the cover, to correspond with the taper of the peg D.

The piece of gum B is provided with a central opening, *f*, to permit the passage of the peg D.

When the cover C is placed upon the box A, and the peg D inserted into the openings *e* and *d* thereof, the device can be used as a spinning-top, as clearly shown in Figs. 1 and 2. Upon withdrawing the peg D the cover can be removed and the gum taken out of the box. When the peg D is not inserted in the openings *d e*, the box may be used as a toy whistle.

The peg D, while forming the spindle on which the top turns in spinning, also forms, by reason of its tapering shape, a fastening for securing the cover to the box.

We claim as our invention—

1. The shallow disk-shaped box composed of the two centrally-perforated flanged portions A C, constructed as described, and adapted to be used either as a toy whistle, or, by the insertion of a peg into the perforations, as a spinning-top.

2. A combined box and spinning-top composed of the circular box A and cover C, provided, respectively, with central openings, *d e*, and the peg D, substantially as shown and described.

FRANK SIBLEY.
J. HOLMWOOD, JR.

Witnesses:
EDWARD WILHELM,
JNO. J. BONNER.